United States Patent
Hsu

(10) Patent No.: US 8,824,141 B2
(45) Date of Patent: Sep. 2, 2014

(54) MOUNTING DEVICE

(75) Inventor: Ming-Chun Hsu, New Taipei (TW)

(73) Assignee: Hon Hai Precision Inudstry Co., Ltd., New Taipei (TW)

( * ) Notice: Subject to any disclaimer, the term of this patent is extended or adjusted under 35 U.S.C. 154(b) by 20 days.

(21) Appl. No.: 13/305,813

(22) Filed: Nov. 29, 2011

(65) Prior Publication Data
US 2012/0248270 A1 Oct. 4, 2012

(30) Foreign Application Priority Data

Apr. 1, 2011 (TW) .............................. 100111666 A

(51) Int. Cl.
G06F 1/16 (2006.01)
(52) U.S. Cl.
USPC .................. 361/679.57; 361/807; 248/225.11
(58) Field of Classification Search
USPC .................. 248/225.11; 361/679.01, 679.02, 361/679.57, 679.58, 679.59, 748, 759, 807, 361/825
See application file for complete search history.

(56) References Cited

U.S. PATENT DOCUMENTS 6,164,603 A * 12/2000 Kawai .............................. 248/73
8,485,479 B2 * 7/2013 Chiu et al. ....................... 248/73
2012/0255949 A1 * 10/2012 Hsu ................................ 220/200

* cited by examiner

*Primary Examiner* — Todd M Epps
(74) *Attorney, Agent, or Firm* — Novak Druce Connolly Bove + Quigg LLP

(57) ABSTRACT

A mounting device capable of mounting two objects of different sizes is disclosed. The mounting device includes a mounting member including a first end, a second end opposite to the first end, a mounting portion, a securing piece between the first end and the second end, and an installing plate including a first installing portion and a second installing portion. The mounting member is secured to the first installing portion and the second installing portion. When the mounting portion and the securing piece are engaged with the first installing portion, the first end is adapted to abut a first object. When the mounting portion and the installing portion are engaged with the second installing portion, the second end is adapted to abut a second object of a different size from a size of the first object.

20 Claims, 6 Drawing Sheets

MOUNTING DEVICE

BACKGROUND

1. Technical Field

The present disclosure relates to mounting devices, and particularly, to a mounting device capable of mounting two objects of different sizes.

2. Description of Related Art

In many mechanism designs, a mounting device, an elastically deformable mounting member which exerts elastic force to engage an object in an installing plate is usually used. The mounting device may be used for mounting a motor in a scanner module or a pump of an ink supplying system in a printer. However, known mounting member may only mount one object, and two different objects of different sizes may need to be mounted by two different mounting members. Therefore an improved mounting device may be desired to overcome the above described disadvantages.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
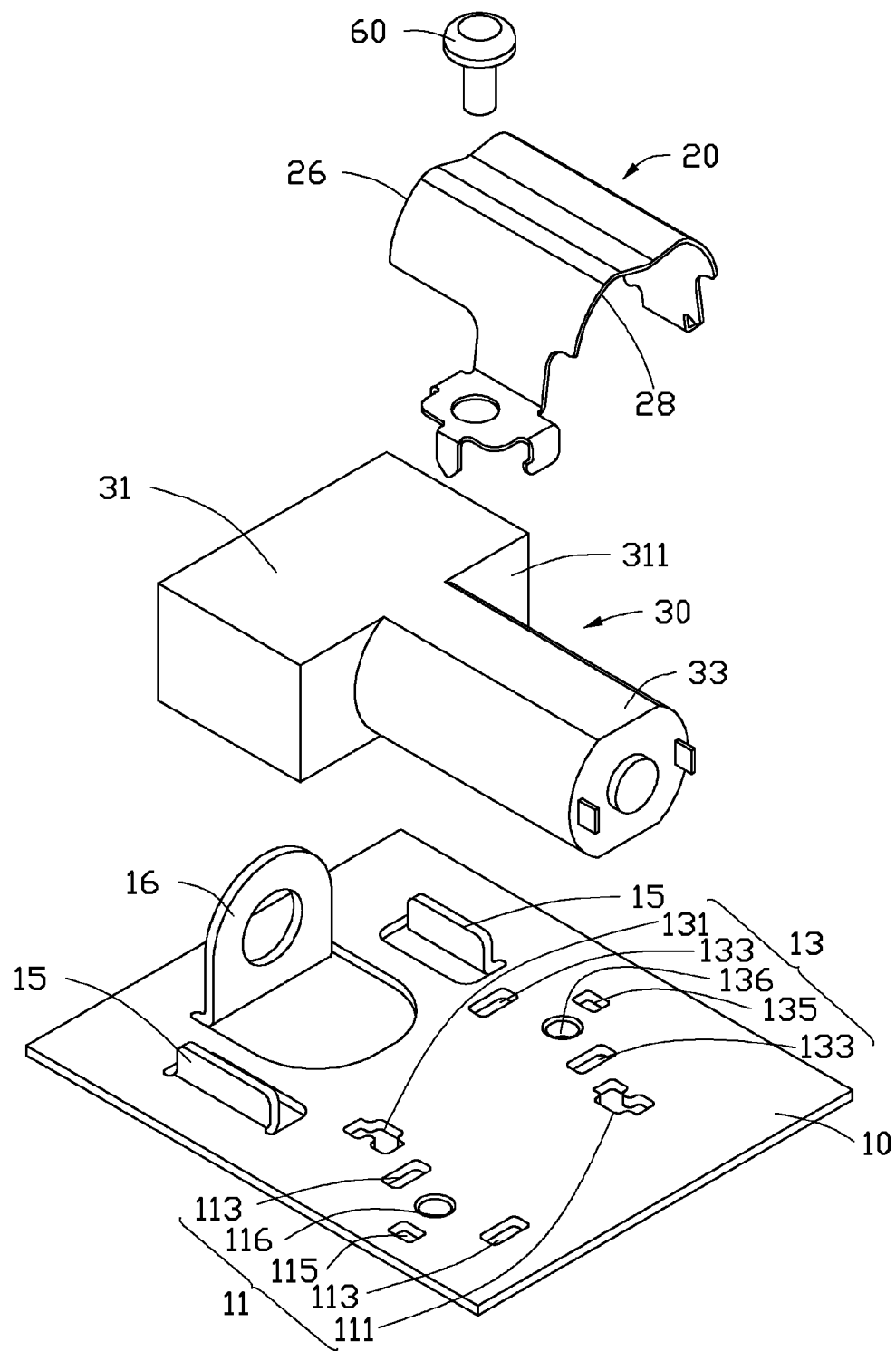
FIG. 1 is an exploded, isometric view of one embodiment of a mounting device and a first object.

Referring to FIG. 1, one embodiment of a mounting device comprises an installing plate 10 and a mounting member 20.

The installing plate 10 comprises a first installing portion 11 and a second installing portion 13. The first installing portion 11 defines a first installing hole 111, two first positioning holes 113, a first through hole 115, and a first locking hole 116. The first installing hole 111 is located in a first side of the installing plate 10. The two first positioning holes 113, the first through hole 115, and the first locking hole 116 are located in a second side of the installing plate 10 opposite to the first side. The first through hole 115 is located between the two first positioning holes 113. The second installing portion 13 comprises a second installing hole 131, two second positioning holes 133, a second through hole 135, and a second locking hole 136. The two second positioning holes 133 are substantially parallel to each other. The second installing hole 131 is located in the second side of the installing plate 10. The two second positioning holes 133, the second through hole 135, and the second locking hole 136 are located in the first side of the installing plate 10. The second locking hole 136 is located between the two second positioning holes 133. In one embodiment, the first locking hole 116 and the second locking hole 136 are round holes. The first through hole 115, each of the two first positioning holes 113, the second through hole 135, and each of the two second positioning holes 133 are substantially rectangle holes. An extending direction of the first through hole 115 is substantially perpendicular to a extending direction of each of the two first positioning holes 113. And an extending direction of the second through hole 135 is substantially perpendicular to an extending direction of each of two second positioning holes 133. Two second limiting pieces 15 and a first limiting piece 16 extend from a top surface of the installing plate 10. In one embodiment, the two second limiting pieces 15 are substantially parallel to each other. The first limiting piece 16 is located between the two second limiting pieces 15, and is substantially perpendicular to the two second limiting pieces 15. In one embodiment, the two second limiting pieces 15 and the first limiting piece 16 are substantially perpendicular to the installing plate 10.

Figure 2:
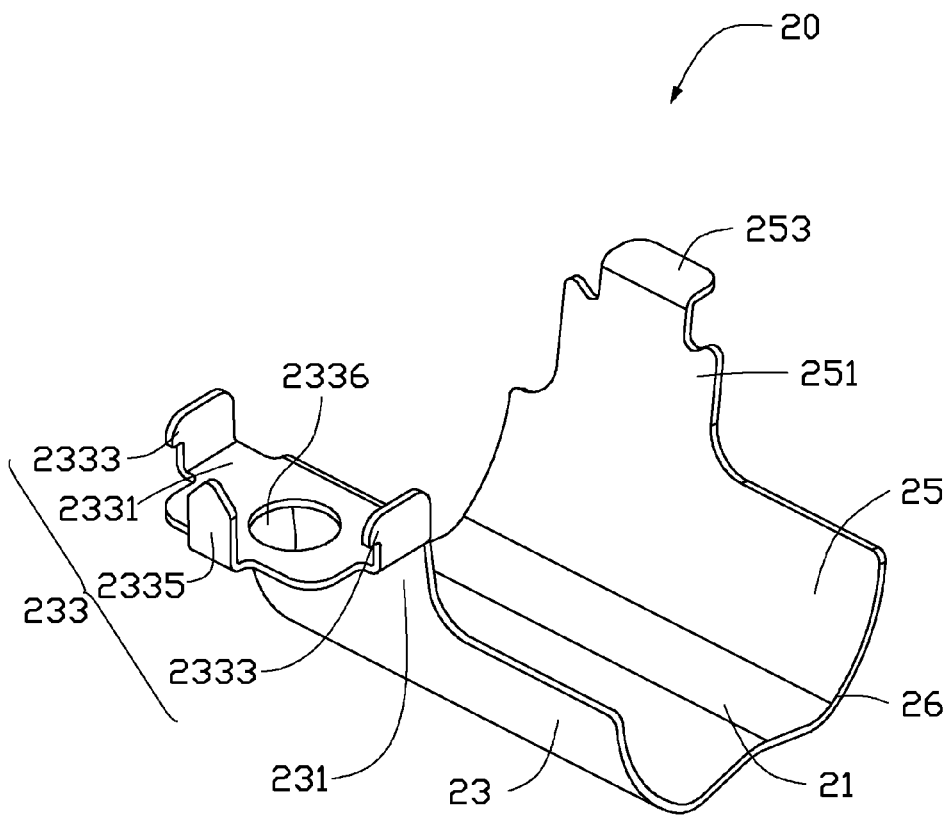
FIG. 2 is an isometric view of a mounting member of the mounting device of FIG. 1.

Referring to FIG. 1 and FIG. 2, the mounting member 20 comprises a recess portion 21, a first mounting plate 23, and a second mounting plate 25. The first mounting plate 23 and the second mounting plate 25 extend from two opposite side edges of the recess portion 21. In one embodiment, the first mounting plate 23 and the second mounting plate 25 are curved plates. The mounting member 20 comprises a first end 26, and a second end 28 opposite to the first end 26. A first connecting piece 231 extends from a top edge of the first mounting plate 23. The first connecting piece 231 is adjacent to the second end 28 and away from the first end 26. A mounting portion 233 bends from the first connecting piece 231. The mounting portion 233 comprises a mounting piece 2331, two positioning pieces 2333, and a flange 2335 extend from the mounting piece 2331. The mounting piece 2331 defines a mounting hole 2336. In one embodiment, the two positioning pieces 2333 are substantially perpendicular to the flange 2335. The two positioning pieces 2333 may be engaged in the two first positioning holes 113 or the two second positioning holes 133. The flange 2335 may be inserted into the first through hole 115 or the second through hole 135. A second connecting piece 251 extends from a top edge of the second mounting plate 25. The second connecting piece 251 is adjacent to the second end 28 and away from the first end 26. A securing piece 253 extends from the second connecting piece 251, and is substantially perpendicular to the second connecting piece 251. The securing piece 253 may be engaged in the first locking hole 116 or the second locking hole 136.

Figure 3:
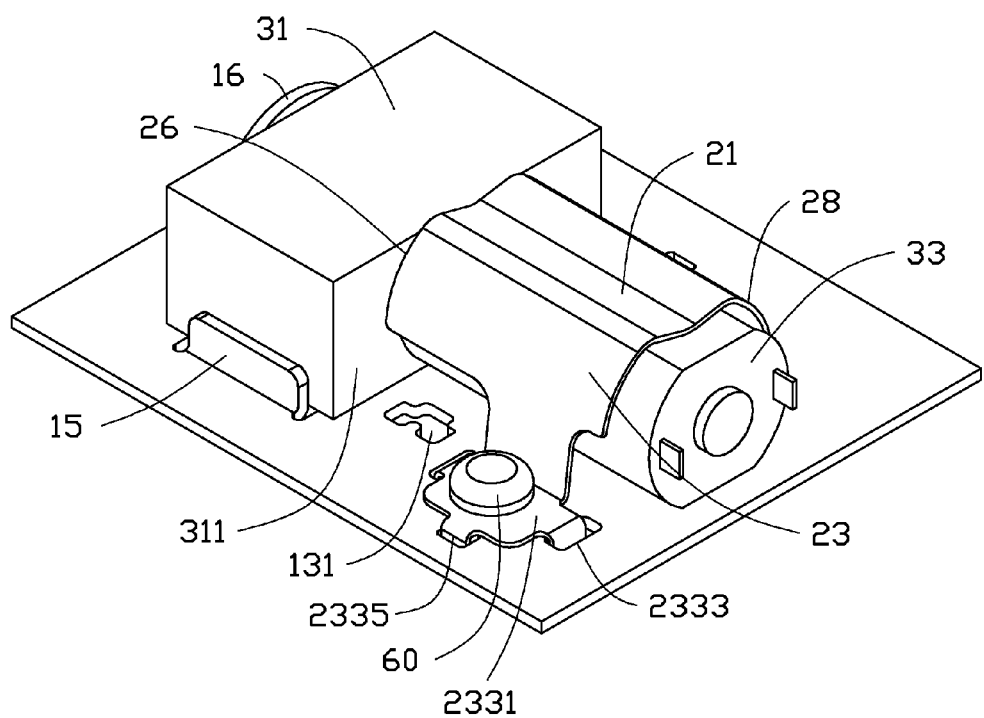
FIG. 3 is an isometric assembled view of the mounting device and the first object of FIG. 1.
Figure 4:
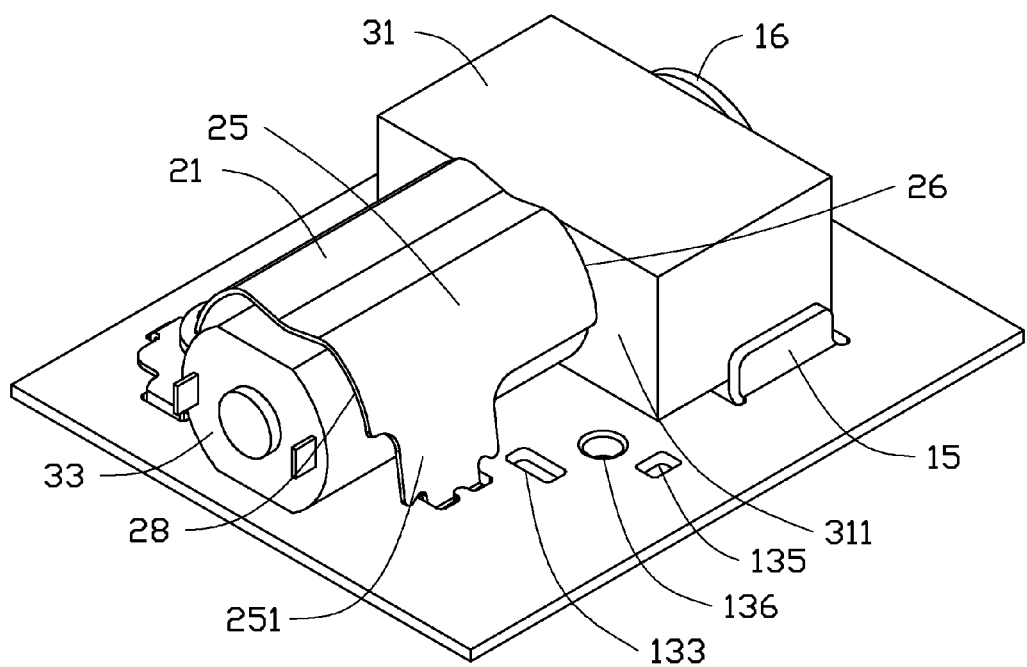
FIG. 4 is similar to FIG. 3, but viewed from another aspect.

Referring to FIGS. 1, 3 and 4, the mounting device is adapted to secure a first object 30. The first object 30 comprises a first limiting portion 31 and a first locking portion 33. The first limiting portion 31 comprises two first sidewalls 311. The two first sidewalls are opposite to each other. The first locking portion 33 is connected to one of the two first sidewalls 311.

In assembly of the first object 30, the first object 30 is located on the installing plate 10, and the first limiting portion 31 abuts against the first limiting piece 16 and each of the two second limiting pieces 15. The mounting member 20 is moved towards the installing plate 10. The securing piece 253 is aligned to the first installing hole 111. The mounting member 20 is aslant moved to insert the securing piece 253 through the first installing hole 111. The securing piece 253 is engaged with a bottom surface of the installing plate 10. The mounting member 10 is rotated towards the installing plate 10 about the securing piece 253, until the recess portion 21 abuts a top surface of the first locking portion 33. Each of the two positioning pieces 2333 are aligned to each of the two first positioning holes 113. The flange 2335 is aligned to the first through hole 115. The mounting hole 2336 is aligned with the first locking hole 116. A locking member 60, such as a screw, is inserted into the mounting hole 2336 and the first locking hole 116. When the locking member 60 is inserted into the first locking hole 116, the mounting member 20 is elastically deformed. Each of the two positioning pieces 2333 is inserted into each of the two first positioning holes 113. Each of the two positioning pieces is engaged with a bottom surface of the installing plate 10, and the flange 2335 is inserted through the first through hole 115. The recess portion 21 presses the top surface of the first locking portion 33 and blocks the first object 30 from moving along a first direction substantially perpendicular to the installing plate 10. The first end 26 of the mounting member 20 abuts each of the two first sidewalls 311 to prevent the first object 30 from moving along a second direction substantially parallel to the installing plate 10.

Figure 5:
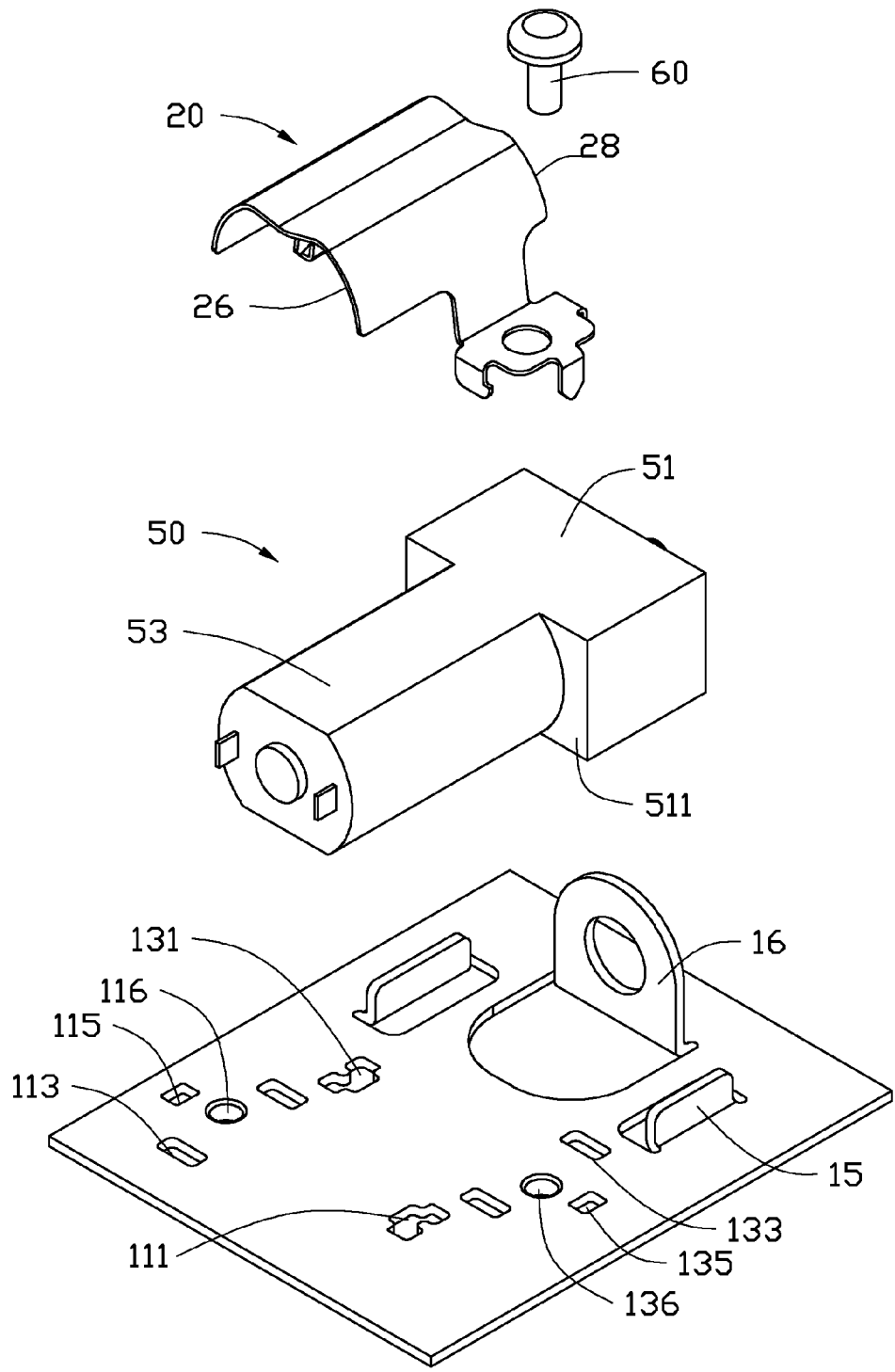
FIG. 5 is an exploded, isometric view of one embodiment of the mounting device and a second object.
Figure 6:
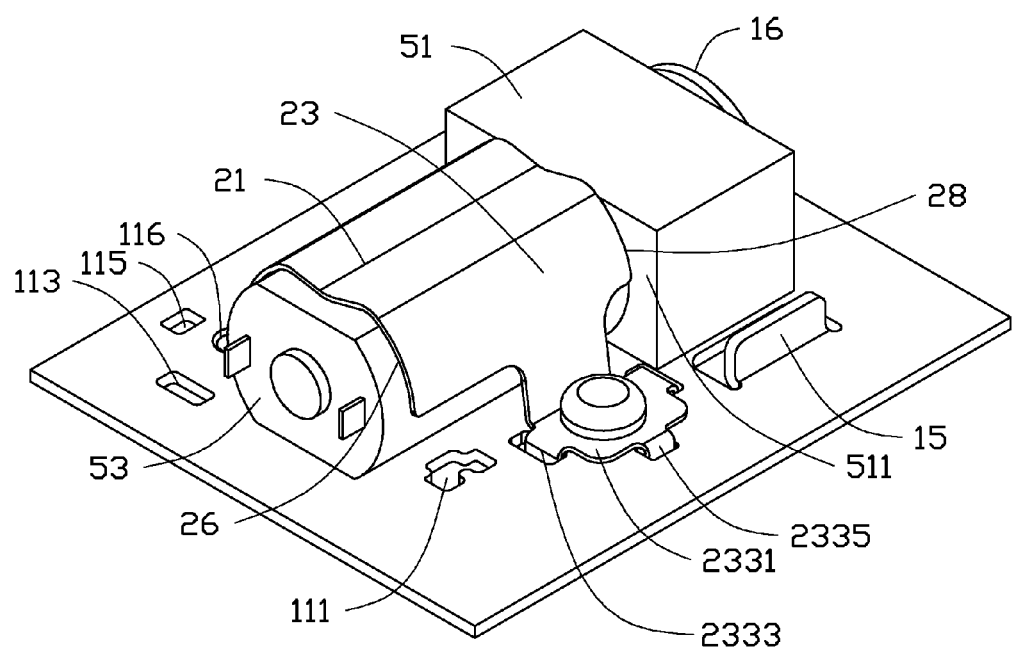
FIG. 6 is an assembled view of the mounting device and the second object of FIG. 5.

Referring to FIGS. 5 and 6, the mounting device is further adapted to alternatively secure a second object 50 with a different size from the first object 30. The second object 50 comprises a second limiting portion 51 and a second locking portion 53. The second limiting portion 51 comprises two second sidewalls 511. The two second sidewalls 511 are opposite to each other. The second locking portion 53 is connected to one of the two second sidewalls 511. A distance between the two second sidewalls 511 is smaller than that between the two first sidewalls 311. In one embodiment, the first object 30 and the second object 50 are two motors with two different sizes.

In assembly of the second object 50, the second object 50 is located on the installing plate 10. The second limiting portion 51 abuts against the first limiting piece 16, and is located between the two second limiting pieces 15 and the first limiting piece 16. The mounting member 20 is moved towards the installing plate 10 and the adjacent to the second locking portion 53. The mounting member 20 is aslant moved to insert the securing piece 253 through the second installing hole 131, and the securing piece 253 is engaged with a bottom surface of the installing plate 10. The mounting member 20 is rotated towards the installing plate 10 about the securing piece 253, until the recess portion 21 abuts a top surface of the second locking portion 53. Each of the two positioning pieces 2333 is aligned to each of the two second positioning holes 133. The flange 2335 is aligned to the second through hole 135. The mounting hole 2336 is aligned to the second locking hole 136. The second end 28 abuts each of the two second sidewalls 511. The locking member 60 is inserted into the mounting hole 2336 and the second locking hole 136. When the locking member 60 is being inserted into the second locking hole 136, the mounting member 20 is elastically deformed. Each of the two positioning pieces 2333 is inserted into each of the twp second positioning holes 133. Each of the two positioning pieces is engaged with a bottom surface of the installing plate 10, and the flange 2335 is inserted through the second through hole 135. The recess portion 21 presses the top surface of the second locking portion 53 and blocks the second object 50 from moving along the first direction substantially perpendicular to the installing plate 10. The second end 28 of the mounting member 20 abuts each of the two second sidewalls 511 to prevent the second object 50 from moving along the second direction substantially parallel to the installing plate 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and the arrangement of parts within the principles of the disclosure, to the full extent indicated by the broad general meaning of the terms in which the appended claims are expressed.

What is claimed is:

1. A mounting device comprising:
 a mounting member comprising a first end, a second end opposite to the first end, a mounting portion, and a securing piece between the first end and the second end; and
 an installing plate comprising a first installing portion, and a second installing portion; wherein the mounting member is operable to be secured selectively at the first installing portion or the second installing portion;
 wherein when the mounting portion is engaged with the first installing portion and the securing piece is engaged with the second installing portion, the first end is adapted to abut a first object; and wherein when the mounting portion is engaged with the second installing portion and the securing piece is engaged with the first installing portion, the second end is adapted to abut a second object of a different size from a size of the first object.

2. The mounting device of claim 1, wherein the mounting portion and the securing piece are adjacent to the second end of the mounting member, and away from the first end of the mounting member.

3. The mounting device of claim 1, the installing plate comprises a top surface and a bottom surface opposite to the top surface, and a first limiting piece extends from the top surface of the installing plate; wherein the first limiting piece is adapted to block the first object and the second object from moving; wherein when the mounting portion is engaged with the first installing portion and the securing piece is engaged with the second installing portion, the first end of the mounting member is between the first limiting piece and the second end of the mounting member; and when the mounting portion is engaged with the second installing portion and the securing piece is engaged with the first installing portion, the second end of the mounting member is between the first limiting piece and the first end of the mounting member.

4. The mounting device of claim 3, wherein a distance between the second installing portion and the first limiting piece is smaller than a distance between the first installing portion and the first limiting piece.

5. The mounting device of claim 3, wherein the first installing portion defines a first positioning hole, the mounting portion comprises a positioning piece, and the positioning piece is engaged with the bottom surface of the installing plate through the positioning hole.

6. The mounting device of claim 1, wherein the first installing portion defines a first locking hole, the mounting portion defines a mounting hole, and a locking member is inserted into the first locking hole and the mounting hole; wherein when the locking member is inserted into the first locking hole and the mounting hole, the mounting member is elastically deformed and secures the first object or the second object to the installing plate.

7. The mounting device of claim 6, wherein a recess portions is defined between the first end and the second end of the mounting member, wherein the recess portion is adapted to secure the first object or the second object between the mounting member and the installing plate.

8. The mounting device of claim 7, wherein the mounting member further comprises two mounting plates; wherein each of the two mounting plates extend from each of two opposite side edges of the recess portion, and the two mounting plates are adapted to abut the first object or the second object.

9. The mounting device of claim 8, wherein the mounting portion extends from one of the two mounting plates, and the securing piece extends from another one of the two mounting plates; the first installing portion further comprises a first installing hole, the second installing portion further comprises a second installing hole, and the securing piece is configured to engage to the first installing hole or the second installing hole; the first installing hole and the second locking hole are in a first side of the installing plate, the second installing hole and the first locking hole are in a second side of the installing plate, and the first side of the installing plate is opposite to the second side of the installing plate.

10. The mounting device of claim 8, wherein each of the two mounting plates is curved.

11. A mounting device comprising:
   a mounting member comprising a first end, a second end opposite to the first end, a mounting portion, and a securing piece between the first end and the second end; and
   an installing plate comprising a top surface, a bottom surface opposite to the top surface, a first installing portion, a second installing portion, a first limiting piece, and two second limiting pieces;
   wherein the mounting member is capable of being secured to the first installing portion and the second installing portion; the first limiting piece and the two second limiting pieces extend from the top surface of the mounting plate; and the first limiting piece and the two second limiting pieces is adapted to secure a first object, or a second object of a different size from a size of the first object therein;
   wherein when the mounting portion is engaged with the first installing portion and the securing piece is engaged with the second installing portion, the first end is adapted to abut the first object, and the first end is between the first limiting piece and the second end; and
   wherein when the mounting portion is engaged with the second installing portion and the securing piece is engaged with the first installing portion, the second end is adapted to abut the second object, and the second end is between the first limiting piece and the first end.

12. The mounting device of claim 11, wherein the mounting portion and the securing piece are adjacent to the second end of the mounting member, and away from the first end of the mounting member.

13. The mounting device of claim 11, wherein the first limiting piece is substantially perpendicular to the two second limiting pieces, and the first limiting piece and the two second limiting pieces are substantially perpendicular to the top surface of the installing plate.

14. The mounting device of claim 11, wherein a distance between the second installing portion and the first limiting piece is smaller than a distance between the first installing portion and the first limiting piece.

15. The mounting device of claim 11, wherein the first installing portion defines a first positioning hole, the mounting portion comprises a positioning piece, and the positioning piece is engaged with the bottom surface of the installing plate through the positioning hole.

16. The mounting device of claim 11, wherein the first installing portion defines a first locking hole, the mounting portion defines a mounting hole, and a locking member is inserted into the first locking hole and the mounting hole; wherein when the locking member is inserted into the first locking hole and the mounting hole, the mounting member is elastically deformed and secures the first object or the second object to the installing plate.

17. The mounting device of claim 16, wherein a recess portions is defined between the first end and the second end of the mounting member, wherein the recess portion is adapted to secure the first object or the second object between the mounting member and the installing plate.

18. The mounting device of claim 17, wherein the mounting member further comprises two mounting plates; wherein each of the two mounting plates extends from each of two opposite side edges of the recess portion, and the two mounting plates are adapted to abut the first object or the second object.

19. The mounting device of claim 18, wherein the mounting portion extends from one of the two mounting plates, and the securing piece extends from another one of the two mounting plates; the first installing portion further comprises a first installing hole, the second installing portion further comprises a second installing hole, and the securing piece is configured to engage to the first installing hole or the second installing hole; the first installing hole and the second locking hole are in a first side of the installing plate, the second installing hole and the first locking hole are in a second side of the installing plate, and the first side of the installing plate is opposite to the second side of the installing plate.

20. The mounting device of claim 18, wherein each of the two mounting plates are curved.

* * * * *